US012627674B2

(12) United States Patent
Mandagere et al.

(10) Patent No.: US 12,627,674 B2
(45) Date of Patent: May 12, 2026

(54) AUTOMATICALLY MANAGING ACCESS POLICIES FOR ARCHIVED OBJECTS

(71) Applicant: Cohesity, Inc., San Jose, CA (US)

(72) Inventors: Nagapramod Mandagere, Los Altos, CA (US); Abhishek Sharma, Newark, CA (US); Venkata Ranga Radhanikanth Guturi, San Jose, CA (US); Anirudh Kumar, San Jose, CA (US); Dane Van Dyck, Atlanta, GA (US)

(73) Assignee: Cohesity, Inc., Santa Clara, CA (US)

( * ) Notice: Subject to any disclaimer, the term of this patent is extended or adjusted under 35 U.S.C. 154(b) by 113 days.

(21) Appl. No.: 17/892,439

(22) Filed: Aug. 22, 2022

(65) Prior Publication Data

US 2023/0362172 A1 Nov. 9, 2023

Related U.S. Application Data

(60) Provisional application No. 63/339,264, filed on May 6, 2022.

(51) Int. Cl.
H04L 9/40 (2022.01)
G06F 11/14 (2026.01)
G06F 11/1446 (2026.01)

(52) U.S. Cl.
CPC ........ H04L 63/108 (2013.01); G06F 11/1451 (2013.01); H04L 63/20 (2013.01)

(58) Field of Classification Search
CPC .... H04L 63/108; H04L 63/20; G06F 11/1451; G06F 21/6272; G06F 21/6218
See application file for complete search history.

(56) References Cited

U.S. PATENT DOCUMENTS

| | | | | |
|---|---|---|---|---|
| 9,699,017 | B1 * | 7/2017 | Gupta | H04L 69/329 |
| 10,095,549 | B1 * | 10/2018 | Needham | G06F 21/602 |
| 10,459,647 | B1 * | 10/2019 | Lazier | G06F 3/064 |
| 10,601,816 | B1 * | 3/2020 | Stickle | H04L 63/0884 |
| 10,656,876 | B1 | 5/2020 | Guturi et al. | |
| 10,657,004 | B1 * | 5/2020 | Dalmia | G06F 16/122 |
| 10,853,350 | B1 * | 12/2020 | Sharifi Mehr | G06F 16/2365 |
| 11,206,269 | B1 | 12/2021 | Van Deman | |
| 11,509,658 | B1 * | 11/2022 | Kulkarni | H04W 12/60 |
| 11,914,696 | B1 * | 2/2024 | Saxe | G06F 21/62 |

(Continued)

OTHER PUBLICATIONS

E. da Silva, A. O. Santin, E. Jamhour, C. Maziero and E. Toktar, "Applying quorum role in network management," 2009 IFIP/IEEE International Symposium on Integrated Network Management, New York, NY, USA, 2009, pp. 591-597, doi: 10.1109/INM.2009. 5188866. (Year: 2009).*

(Continued)

*Primary Examiner* — Patrice L Winder
(74) *Attorney, Agent, or Firm* — Shumaker & Sieffert, P.A.

(57) ABSTRACT

An archival storage of data backed up from a repository storage of a primary storage is maintained. Access to data stored in archival storage is limited by one or more access policies based on whether a corresponding data restore has been authorized. A request for specific data stored in the archival storage is received. The one or more access policies are automatically managed based on status and timing of one or more data restore authorizations for the specific data stored in the archival storage.

18 Claims, 7 Drawing Sheets

(56)            References Cited

U.S. PATENT DOCUMENTS

| 2009/0144545 | A1* | 6/2009 | Dhuvur | G06F 21/552 |
| | | | | 713/165 |
| 2012/0198455 | A1* | 8/2012 | Lee | H04L 67/51 |
| | | | | 718/100 |
| 2012/0203742 | A1* | 8/2012 | Goodman | G06F 16/128 |
| | | | | 707/649 |
| 2014/0006357 | A1* | 1/2014 | Davis | G06F 16/182 |
| | | | | 707/667 |
| 2014/0046906 | A1* | 2/2014 | Patiejunas | G06F 21/6209 |
| | | | | 707/661 |
| 2014/0222866 | A1* | 8/2014 | Joneja | G06F 21/6218 |
| | | | | 707/827 |
| 2015/0121549 | A1* | 4/2015 | Baessler | G06F 21/62 |
| | | | | 726/28 |
| 2016/0219081 | A1* | 7/2016 | Kruse | H04L 63/20 |
| 2018/0067951 | A1* | 3/2018 | Brandwine | G06F 16/9538 |
| 2019/0286534 | A1* | 9/2019 | O'Mahony | G06F 21/565 |
| 2020/0150897 | A1 | 5/2020 | Guturi et al. | |
| 2020/0319799 | A1* | 10/2020 | Mayer | G06F 9/45558 |
| 2020/0341689 | A1* | 10/2020 | Smith | G06F 3/0614 |
| 2020/0401325 | A1* | 12/2020 | Lamba | G06F 21/6209 |
| 2021/0103656 | A1* | 4/2021 | Tahmasebi | G06F 21/606 |
| 2021/0263886 | A1* | 8/2021 | Suarez | G06F 16/113 |
| 2023/0009739 | A1* | 1/2023 | Ponnuswamy | H04L 9/3213 |

OTHER PUBLICATIONS

International Search Report and Written Opinion of International Application No. PCT/US2023/021192 dated Sep. 1, 2023, 11 pp.
U.S. Appl. No. 17/681,471, filed Feb. 25, 2022, naming inventors Jagannati et al.

* cited by examiner

200

Maintain An Archival Storage Of Data
Backed Up From A Repository Storage Of  A
Primary System                          — 202

Receive A Request For Specific Data Stored
In The Archival Storage                 — 204

Automatically Manage One Or More Policies
For Specific Data Stored In The Archival
Storage Based In Part On Status And Timing   — 206
Of One Or More Data Restore Authorizations

400

Receive A Request For Credentials To Access One Or More Objects — 402

Validated? — 404

No → Deny Request

410

Yes

Create Credentials — 406

Provide Credentials — 408

450

Receive A Selection Of One Or More Objects — 452

Provide A Request For Credentials To Access One Or More Archived Objects — 454

Receive Credentials — 456

Use Credentials To Access One Or More Archived Objects — 458

500

502 Receive A Notification That A Credential Has Expired Or Is About To Expire

504 Restore Completed?

End ←—Yes

No

506 Provide A Request For A New/Extended Credential

508 Receive A New/Extended Credential

510 Resume Restore Operation

600

Receive A Selection Of A Storage System To Perform A Recovery Operation — 602

Receive A Search Job — 604

606 — Quorum?

No → Deny Request — 618

Yes

Submit Search Job To Selected Storage System — 608

Record Search Job Identifer — 610

Receive A Selection Of An Archived Backup Snapshot — 612

614 — Time Valid?

No

Yes

Generate And Provide Credentials — 616

AUTOMATICALLY MANAGING ACCESS POLICIES FOR ARCHIVED OBJECTS

CROSS REFERENCE TO OTHER APPLICATIONS

This application claims priority to U.S. Provisional Patent Application No. 63/339,264 entitled AUTOMATICALLY MANAGING ACCESS POLICIES FOR ARCHIVED OBJECTS filed May 6, 2022, which is incorporated herein by reference for all purposes.

BACKGROUND OF THE INVENTION

Data stored in a primary site may be protected by creating three copies of data, keeping data on at least two types of storage media, and storing one of the backups at a remote site (e.g., secure storage, cloud storage, etc.). The first copy of data is stored on a source system and the other two copies of data are backups of the source system. The primary site may include a source system that is connected to a primary site storage system. A copy of the data may be directly provided from the source system to a remote site storage system or indirectly provided from the source system to the remote site storage system via the primary site storage system. The primary site source system and/or the primary site storage system may be connected to the remote site storage system at the remote site. These connections may be persistent connections. As a result, all three copies of data may be subject to being compromised by a malicious actor.

For example, the malicious actor may obtain credentials for the source system. The malicious actor may utilize the credentials to access the storage system at the primary site and/or the storage system at the remote site to take advantage of the persistent connections associated with the source system, the primary site storage system, and the remote site storage system. The malicious actor may read, write, and/or delete the data stored at the storage systems.

The malicious actor may also subject the data stored at the storage systems to ransomware. After subjecting the data stored at the storage systems to ransomware, the malicious actor may delete or encrypt data stored at the source system. As a result, the source system may be unable to be recovered to a particular point in time corresponding to a backup unless an entity associated with the source system (e.g., a user, a company, an organization, an enterprise, a government, an institution, etc.) complies with the malicious actor's demands.

BRIEF DESCRIPTION OF THE DRAWINGS

Various embodiments of the invention are disclosed in the following detailed description and the accompanying drawings.

DETAILED DESCRIPTION

Figure 1:
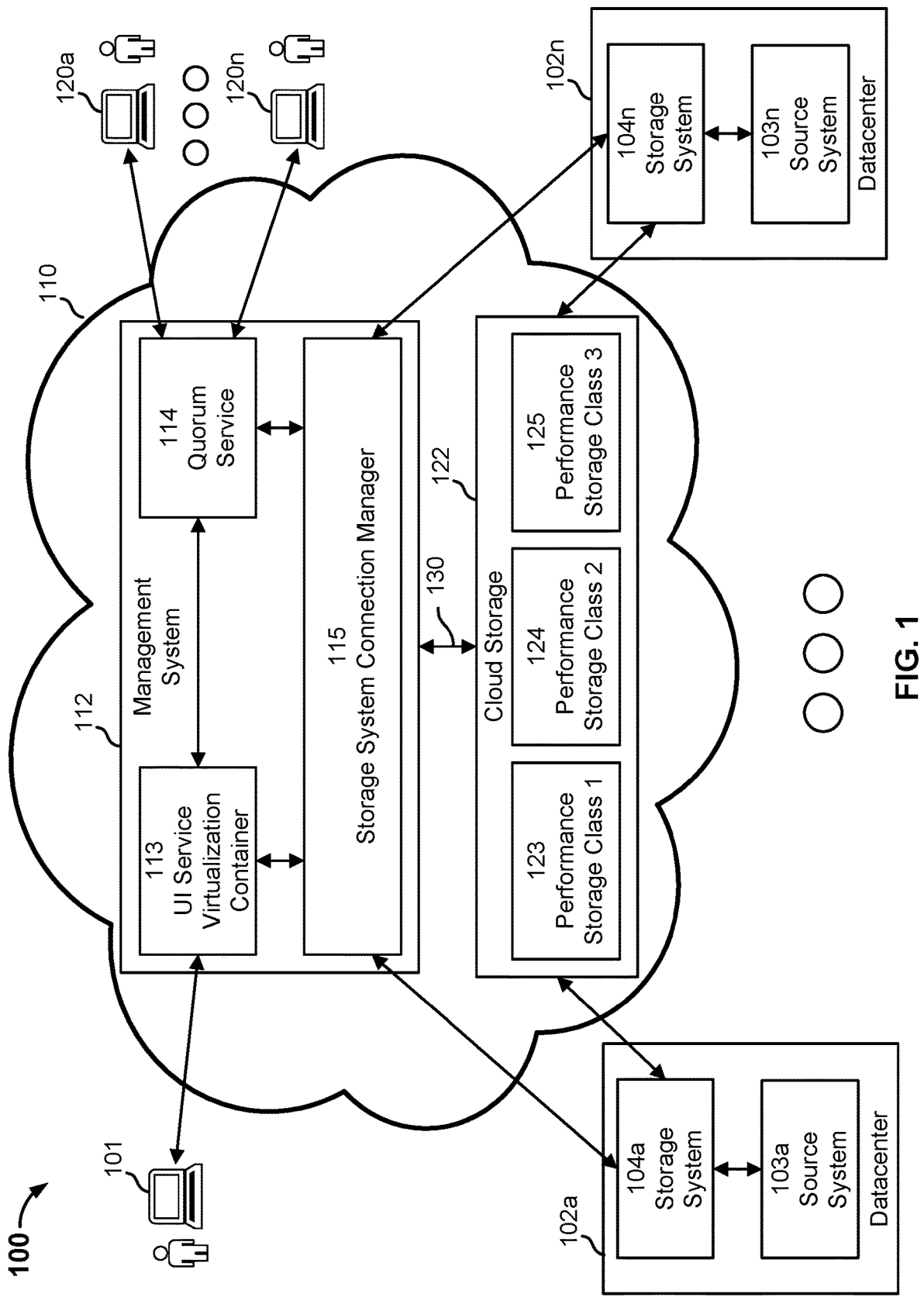
FIG. 1 is a block diagram illustrating an embodiment of a system for automatically managing access policies for archived objects.

One or more objects associated with a source system may be archived to a cloud storage or another type of archival storage. A cloud storage provider associated with the cloud storage may provide the ability to control access to one or more archived objects via one or more access policies (e.g., Identity and Access Management (IAM) policy). The one or more archived objects may not be accessed (e.g., read access or write access) unless there is a corresponding access policy for the one or more archived objects that grants access. A malicious actor may gain access to the one or more archived objects so long as a corresponding access policy exists for the one or more archived objects. If such a corresponding access policy does not exist, the malicious actor may gain access to the one or more archived objects upon the corresponding access policy being generated.

A cloud-based management system maintains at the cloud storage an archive comprised of one or more backup snapshots of the source system that were archived to the cloud storage. In some embodiments, a storage system performed one or more backups of the source system to generate the one or more backup snapshots and archived the one or more backup snapshots from the storage system to the cloud storage. In some embodiments, the one of more backup snapshots are archived directly from the source system to the cloud storage. Each backup snapshot is comprised of data associated with one or more objects (e.g., source system metadata, storage system metadata, and/or data content). An object may refer to a file, a virtual machine, a database, an application, a container, etc. An archived object includes data associated with one or more backup snapshots. The cloud-based management system controls access to the one or more objects associated with the archived backup snapshot(s) via one or more access policies. By default, an archived object does not have an associated access policy. This prevents a malicious actor from gaining access to the archived object.

A malicious actor may attempt to gain access to the archived object(s) by obtaining credentials that enable the malicious actor to generate an access policy granting access, however, the disclosed technique provides a multi-layer security architecture that may prevent such a scenario from happening. A technique to automatically manage access policies for archived objects is disclosed. Although the technique is described with respect to a restore operation, the technique disclosed herein may be applicable whenever a data management operation (e.g., backup, migration, replication, archive, etc.) is performed for a cohort of data that is provided from a first system to a second system.

The cloud-based management system may receive from a user device a request to restore one or more objects associated with a particular archived backup snapshot. In some embodiments, the request is for one or more objects associated a plurality of archived backup snapshots. A cloud storage provider may store backup snapshots and their associated objects in one or more buckets associated with the cloud storage. The cloud storage may be an object storage with a flat address space. An archived backup snapshot and its associated objects may have a prefix (e.g., string of characters) inserted at the beginning of the snapshot or object's name. Archived backup snapshots and their associated objects are stored together in the same bucket and have at least partially common prefixes. The request to restore one or more objects associated with the particular archived backup snapshot may include a particular prefix (e.g., a full or partial prefix). In some embodiments, multiple copies of snapshots and their associated objects are stored in multiple buckets. For example, a customer may store replicas in different regions for resiliency. The request to restore the one or more objects associated with a particular archived backup snapshot may include the particular prefix and the particular bucket.

The disclosed technique requires a restore of the one or more objects associated with the particular archived backup snapshot to be authorized before an access policy that grants access to the one or more requested objects is generated. The restore request for the one or more objects associated with a particular archived backup snapshot to be restored may be authorized after a quorum of approvals is obtained for the restore request.

An example of a quorum approval process is described in U.S. patent application Ser. No. 17/681,471 entitled "Quorum In A Distributed System," the entire contents of which is incorporated by reference for all purposes. The cloud-based management system may store a quorum specification that identifies one or more data management operations, such as a restore operation, requiring quorum approval before a data management operation may be performed for one or more archived backup snapshots or one or more objects associated with the one or more archived backup snapshots. The quorum specification specifies a number of approvers included in a set of approvers that need to approve the data management operation to obtain a quorum of approvals.

After the quorum of approvals is obtained for the requested restore operation, the cloud-based management system automatically manages one or more access policies for the one or more requested objects associated with the particular archived backup snapshot in the archival storage based on status and timing of the authorized restore operation. The cloud-based management system may generate an access policy that permits access to the one or more requested objects associated with the particular archived backup snapshot and provide the generated access policy to a cloud storage provider. The cloud storage provider utilizes the generated access policy to determine whether to permit or deny access to objects stored in cloud storage. In some embodiments, the generated access policy permits access for one or more objects having a particular prefix included in the request. This limits access to archived objects in a manner that prevents unauthorized data exfiltration of one or more objects associated with the particular archived backup snapshot to be restored.

The cloud-based management system provides the user device a notification that the request to restore the specific data stored in the archival storage is granted. In response to the notification, a user associated with the user device may cause a storage system to initiate a restore of the one or more objects associated with the particular archived backup snapshot. In some embodiments, the storage system automatically initiates the restore of the one or more objects associated with the particular archived backup snapshot. In some embodiments, the storage system is the storage system that archived the particular backup snapshot to the cloud storage. In some embodiments, the storage system is a different storage system than the storage system that archived the backup snapshot to the cloud storage. The storage system stores an index that identifies the one or more objects associated with a particular archived backup snapshot.

The storage system may receive from the user device a selection of one or more objects associated with the particular archived backup snapshot for which a user wants access. The storage system may send to the cloud-based management system a request for a credential to access the one or more objects associated with the particular archived backup snapshot. In some embodiments, the request identifies one or more objects having a particular prefix.

In response to the request, the cloud-based management system validates the storage system from which the request is received based on one or more factors, such as whether the storage system is registered with the cloud-based management system, whether the storage system is registered to an account associated with the archived backup snapshot, whether a restore operation for the one or more objects associated with the particular archived backup snapshot has been authorized, etc. In response to validating the storage system, the cloud-based management system creates credentials for the one or more objects associated with the particular archived backup snapshot and provides the credentials to the storage system. In some embodiments, the one or more objects associated with the particular archived backup snapshot are associated with a single archived object and the cloud-based management system generates credentials that allows access to the single archived object. In some embodiments, data of the one or more objects associated with the particular archived backup snapshot is spread across a plurality of archived objects and the cloud-based management system generates credentials that allows access to the plurality of archived objects that include the data of the one or more objects associated with the particular archived backup snapshot. In some embodiments, the credentials provide access to one or more objects having a particular prefix. In response to the storage system not being validated, the cloud-based management system denies the request. In some embodiments, the cloud-based management system provides to the requesting storage system a notification of the denial.

The one or more generated access policies by the cloud-based management system are valid for a limited period of time (e.g., the expected duration of an authorized restore operation, the actual amount of time needed to perform the authorized restore operation, etc.). The storage system may utilize the credentials to access at the cloud storage the one or more objects associated with the particular archived backup snapshot during the authorized restore operation. The credentials have an associated expiration time (e.g., one hour). This prevents a storage system from having unfettered access to the one or more objects associated with the archived backup snapshot. In some embodiments, the credentials expire before a restore of the one or more objects associated with the particular archived backup snapshot has completed. The storage system may send to the cloud-based management system a request for new credentials or a request for the current credentials to be renewed. In response to the request, the cloud-based management system may determine whether to deny the request or renew the current credentials/generate new credentials in a manner as described herein.

The cloud-based management system deletes the one or more generated access policies upon a completion of the authorized restore operation or soon thereafter. As a result, the temporary access to the one or more archived objects associated with the particular archived backup snapshot is terminated and a malicious actor is unable to access the one or more archived objects associated with the particular archived backup snapshot.

FIG. 1 is a block diagram illustrating an embodiment of a system for automatically managing access policies for archived objects. In the example shown, system 100 includes a cloud-based management system 112 located in cloud environment 110 that is coupled to storage systems 104a . . . 104n. Storage systems 104a . . . 104n are coupled to source systems 103a . . . 103n respectively. Storage system 104a and source system 103a are located in datacenter 102a and storage system 104n and source system 103n are located in datacenter 102n. Although FIG. 1 depicts the cloud-based management system 112 coupled to two storage systems, the cloud-based management system 112 may be coupled to n storage systems where n is an integer and greater than or equal to 1. Source systems 103a . . . 103n may be a server, a virtual machine, a container, a database, etc. Cloud environment 110 (e.g., public cloud, private cloud, hybrid cloud, etc.) may be provided by a cloud provider (e.g., Amazon Web Services™, Microsoft™ Azure, Google Cloud™, etc.).

Storage systems 104a . . . 104n include a corresponding set of storage nodes. A storage system may be comprised of n storage nodes. In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of a storage system.

In some embodiments, a storage node of storage systems 104a . . . 104n includes a processor, memory, and a plurality of storage devices. A storage device may be a solid-state drive, a hard disk drive, a flash storage device, etc. The plurality of storage devices may include one or more solid state drives, one or more hard disk drives, one or more flash storage devices, or a combination thereof.

In some embodiments, a storage node of storage systems 104a . . . 104n includes a processor and memory, and is coupled to a separate storage appliance. The separate storage appliance may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the plurality of objects that were backed up to a storage system. For example, the separate storage device may be segmented into 10 partitions and the storage system may include 10 nodes. A storage node of the 10 storage nodes may be allocated one of the 10 partitions.

In some embodiments, a storage node of storage systems 104a . . . 104n includes a processor, memory, and a storage device. The storage node may be coupled to a separate storage appliance. The separate storage device may include one or more storage devices. A storage device may be segmented into a plurality of partitions. Each of the storage nodes may be allocated one or more of the partitions. The one or more partitions allocated to a storage node may be configured to store data associated with some or all of the plurality of objects that were backed up to a storage system. For example, the separate storage device may be segmented into 10 partitions and the storage system may include 10 storage nodes. A storage node of the 10 storage nodes may be allocated one of the 10 partitions.

Storage systems 104a . . . 104n may be a cloud instantiation of a storage system. A configuration of cloud instantiation of storage system 104a . . . 104n may be a virtual replica of storage systems 104a . . . 104n. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of storage system.

Storage systems 104a . . . 104n are coupled to cloud storage 122. Cloud storage 122 includes a first performance storage class 123 (e.g., Amazon Simple Storage Service (S3)), a second performance storage class 124 (e.g., Amazon S3 Glacier), and a third performance storage class 125 (e.g., Amazon S3 Glacier Deep Archive). Although FIG. 1 depicts cloud storage 122 as having three performance tiers, cloud storage 122 may have n performance tiers. Each of the performance tiers corresponds to an object storage provided by a cloud provider (e.g., Amazon Web Services™, Microsoft™ Azure, Google Cloud™, etc.) that provides cloud environment 121 (e.g., public cloud, private cloud, hybrid cloud, etc.). The speed at which data may be accessed is different depending on whether the data is associated with the first performance storage class 123, the second performance storage class 124, or the third performance storage class 125.

Cloud-based management system 112 maintains at cloud storage 122 an archive comprised of one or more backup snapshots of source systems 103a . . . 103n that were archived to cloud storage 122. A backup snapshot may be archived to the first performance storage class 123, the second performance storage class 124, or the third performance storage class 125. In some embodiments, storage system 104a . . . 104n performed one or more backups of a respective source system 103a . . . 103n to generate the one or more backup snapshots and archived the one or more backup snapshots from storage system 104a . . . 104n to cloud storage 122. In some embodiments, the one or more backup snapshots are archived directly from a source system 103a . . . 103n to cloud storage 122. Each backup snapshot is comprised of data associated with one or more objects. An object may refer to a file, a virtual machine, a database, an application, a container, etc. Cloud-based management system 112 controls access to the one or more objects associated with the archived backup snapshot(s) via one or more access policies. By default, an archived object does not have an associated access policy. This prevents a malicious actor from gaining access to the archived object(s).

A user associated with an entity (e.g., an administrator) may register storage systems 104a . . . 104n with the cloud-based management system 112. This enables storage systems 104a . . . 104n to be managed via the cloud-based management system 112. A user associated with an entity provides quorum service 114 a quorum specification that includes a set of operations (e.g., one or more data management operations) that require a quorum of approvals before any operation included in the set is allowed to be performed (e.g., a restore of one or more of the archived backup snapshots). The quorum specification also includes a set of approvers that need to approve any operation included in the set of operations before any operation included in the set is allowed to be performed. Quorum server 114 generates a quorum policy based on the quorum specification. The quorum policy indicates the one or more operations associated with a storage system that require a quorum of approvals. Quorum service 114 is configured to store a copy of the policy.

Cloud-based management system 112 is configured to provide a user device 101 (e.g., a laptop, a desktop, a server, a tablet, a smartphone, etc.) the ability to access and manage storage systems 104a . . . 104n via user interface (UI) service virtualization container 113.

UI service virtualization container 113 may receive from user device 101 a request to restore one or more objects associated with a particular archived backup snapshot and provide the request to quorum service 114. The request may include information associated with a destination for the requested operation (e.g., one of the storage systems 104a, 104n). For example, the information may include a specified storage system identifier associated with a storage system that is to perform the requested operation. In response to receiving the request, quorum service 114 determines whether a stored quorum policy associated with the entity indicates that the requested operation requires a quorum of approvals before a storage system to which the operation is directed is permitted to perform the operation. The quorum policy may specify that the requested restore operation needs to be authorized before cloud-based management system 112 generates an access policy that grants access to any of the objects associated with the particular archived backup snapshot. In some embodiments, the one or more objects associated with the particular archived backup snapshot are unavailable for restore during a particular duration (e.g., a "blackout period") even if the requested operation has received a quorum of approvals.

In the event the requested operation does not require a quorum of approvals, quorum service 114 provides a command to perform the requested operation to storage system connection manager 115, which then provides the command to the storage system using a secure connection (e.g., Google Remote Procedure Call (gRPC) connection). In the event the requested operation requires a quorum of approvals, quorum service 114 provides to the computing devices 120a . . . 120n associated with the approvers included in the quorum specification a notification of the requested operation.

The notification may be provided via electronic mail, text message, automated telephone call, etc. The notification may request an approver to login to the cloud-based management system to approve the requested operation. In some embodiments, the approver is able to approve the requested operation from the device that received the notification. Quorum service 114 may store contact information associated with an approver. In some embodiments, quorum service 114 is configured to provide the notification to an approver via a preferred medium of communication (e.g., specified by the approver). In some embodiments, quorum service 114 is configured to provide the notification to all mediums of communication known to be associated with the approver. In some embodiments, quorum service 114 is configured to provide a first notification to an approver via a first communication medium and provide a second notification to the approver via a second communication medium in the event a response is not received from the approver within a threshold period of time. The cloud-based management system may log each time a requested operation is denied. In some embodiments, an anomalous behavior detection system analyzes the denied operations stored in a log to determine whether there is anomalous behavior. In some embodiments, the anomalous behavior detection system notifies an administrator in the event a particular operation is denied more than a threshold number of times. In some embodiments, the anomalous behavior detection system notifies an administrator in the event a particular operation is denied more than a threshold number of times within a particular period of time.

Quorum service 114 may be configured to initiate a timer that indicates when a quorum of approvals for the requested operation needs to be received. In some embodiments, the timer is specified by an administrator associated with the entity. In some embodiments, the timer is a default amount of time (e.g., 30 minutes). The length of the timer may be specific to the type of operation being requested (e.g., a first type of operation is associated with a first period of time and a second type of operation is associated with a second period of time).

The quorum service 114 waits for responses from the approvers included in the set of approvers. The quorum service 114 determines whether the quorum of approvals for the requested operation has been received within a period of time associated with the timer. In response to a determination that the quorum of approvals for the requested operation has been received within the period of time associated with the timer, the quorum service 114 determines that the quorum of approvals has been obtained and provides to the storage system, via storage system connection manager 115, a command to perform the requested operation (e.g., a restore of the particular archived backup snapshot). In some embodiments, the quorum service 114 provides the command to the storage system as soon as the quorum of approvals has been obtained. In some embodiments, the storage system is the storage system that archived the backup snapshot to cloud storage 122. In some embodiments, the storage system is a different storage system than the storage system that archived the backup snapshot to cloud storage 122. In some embodiments, cloud-based management system 112 provides the command to the storage system after the timer has expired. This provides approvers with the ability to change their response in the event they accidentally approved the requested operation. In response to a determination that the required number of approvals for the requested operation has not been received within the period of time associated with the timer, the quorum service 114 denies the requested operation from being performed and provides to the user device 101 a notification that the requested operation has been denied.

The cloud-based management system provides the user device a notification that access to one or more objects associated with an archived backup snapshot to be restored is granted. In response to the notification, a user associated with the user device may cause a storage system to initiate a restore of the one or more objects associated with the particular archived backup snapshot. In some embodiments, the storage system automatically initiates the restore of the one or more objects associated with the particular archived backup snapshot. In some embodiments, the storage system is the storage system that archived the particular backup snapshot to the cloud storage. In some embodiments, the storage system is a different storage system than the storage system that archived the backup snapshot to the cloud storage. The storage system stores an index that identifies the one or more objects associated with a particular archived backup snapshot. The storage system may receive from user device 101 a selection of one or more objects associated with the particular archived backup snapshot for which a user wants access. The storage system receiving the command may send to cloud-based management system 112 a request for a credential to access the one or more objects associated with the particular archived backup snapshot. In some embodiments, the request identifies one or more objects having a particular prefix. In some embodiments, the one or more objects associated with the particular archived backup snapshot are associated with a single archived object. The storage system 112 may send to cloud-based management 112 a request for a credential to access the single archived object. In some embodiments, data of the one or more objects associated with the particular archived backup snapshot is spread across a plurality of archived objects. The storage system 112 may send to cloud-based management 112 a request for a credential to access the plurality of archived objects that include the data of the one or more objects associated with the particular archived backup snapshot.

In response to the request, cloud-based management system 122 validates the storage system from which the request is received (e.g., one of the storage systems 104a . . . 104n) based on one or more factors, such as whether the storage system is registered with the cloud-based management system, whether the storage system is registered to an account associated with the archived backup snapshot, whether a restore operation for the one or more requested objects associated with the particular archived backup snapshot has been authorized, etc. In response to validating the storage system, cloud-based management system 122 creates credentials for the one or more objects associated with the particular archived backup snapshot and provides the credentials to the storage system. In some embodiments, the credentials provide access to one or more objects having a particular prefix. In response to the storage system not being validated, the cloud-based management system denies the request. In some embodiments, the cloud-based management system provides to the requesting storage system a notification of the denial.

The one or more generated access policies are valid for a limited period of time (e.g., the expected duration of the authorized restore operation, the actual amount of time needed to perform the authorized restore operation, etc.). The storage system may utilize the credentials to access at cloud storage 122 the one or more objects associated with the particular archived backup snapshot during the authorized restore operation. The credentials have an associated expiration time (e.g., one hour). This prevents a storage system from having unfettered access to the one or more objects associated with the particular archived backup snapshot. In some embodiments, the credentials expire before a restore of the one or more objects associated with the particular archived backup snapshot has completed. The storage system may send to cloud-based management system 112 a request for new credentials or a request for the current credentials to be renewed. In response to the request, cloud-based management system 112 may determine whether to deny the request or renew the current credentials/generate new credentials in a manner as described herein.

Cloud-based management system 112 deletes the one or more generated access policies upon a completion of the authorized restore operation or soon thereafter. As a result, the temporary access to the one or more archived objects associated with the particular archived backup snapshot is terminated and a malicious actor is unable to access the one or more archived objects associated with the particular archived backup snapshot.

Figure 2:
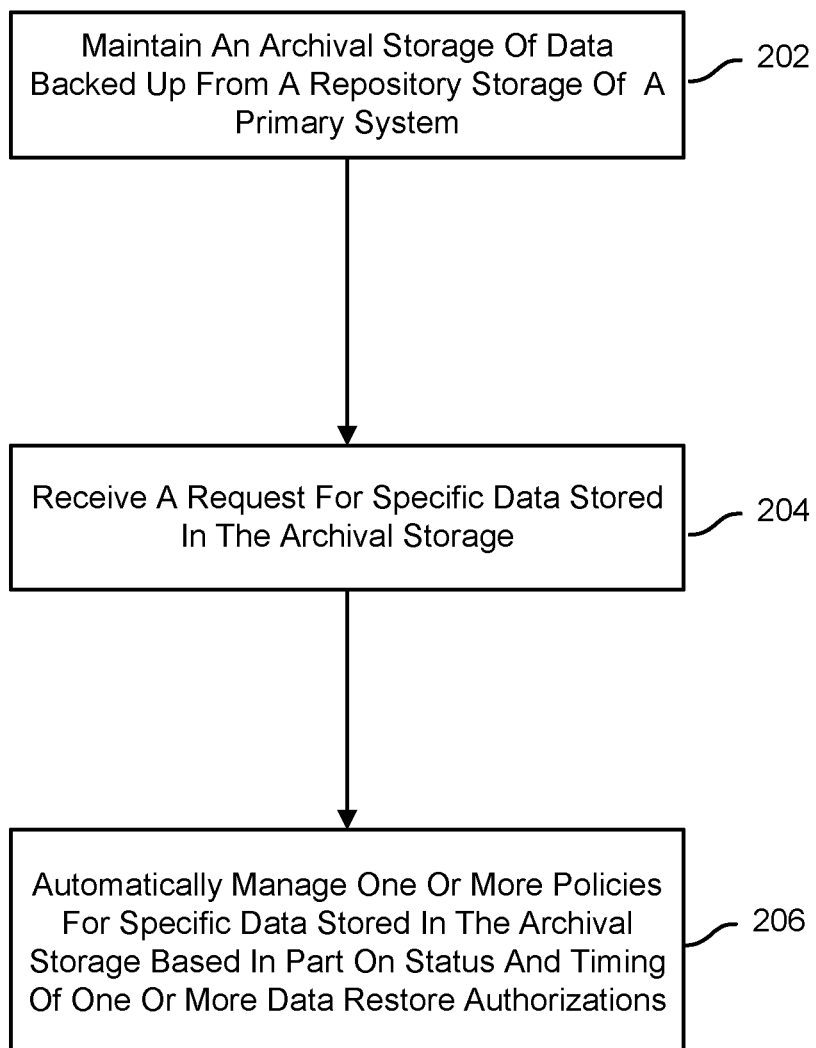
FIG. 2 is a flow diagram illustrating an embodiment of a process for automatically managing access policies for archived objects.

FIG. 2 is a flow diagram illustrating an embodiment of a process for automatically managing access policies for archived objects. In the example shown, process 200 may be implemented by a cloud-based management system, such as cloud-based management system 112.

At 202, an archival storage of data backed up from a repository storage of a primary system is maintained. A cloud-based management system maintains at the cloud storage an archive comprised of one or more backup snapshots of the source system that were archived to the cloud storage. In some embodiments, a storage system performed one or more backups of the source system to generate the one or more backup snapshots and archived the one or more backup snapshots from the storage system to the cloud storage. In some embodiments, the one of more backup snapshots are archived directly from the source system to the cloud storage. Each backup snapshot is comprised of data associated with one or more objects (e.g., source system metadata, storage system metadata, and/or data content). The cloud-based management system controls access to the one or more objects associated with the archived backup snapshot(s) via one or more access policies. By default, an archived object does not have an associated access policy. This prevents a malicious actor from gaining access to the archived object(s). Access to data stored in the archival storage is limited by one or more access policies based on whether a corresponding data restore has been authorized.

At 204, a request for specific data stored in the archival storage is received. A user logs into a cloud-based management system via a user account associated with the cloud-based management system. The user provides a request for the specific data stored in the archival storage. In some embodiments, the request for specific data stored in the archival storage is for one or more objects associated with a particular archived backup snapshot. In some embodiments, the request for specific data stored in the archival storage is for one or more objects associated with a plurality of archived backup snapshots. In some embodiments, the request is for objects having a particular prefix.

At 206, one or more access policies for the specific data stored in the archival storage is automatically managed based in part on status and timing of one or more data restore authorizations. In some embodiments, the one or more access policies for the specific data stored in the archival storage is automatically managed based on the metadata of the request itself, e.g., the metadata of the requested object. An authorized restore of an archived backup snapshot is required before an access policy that grants access to any of the objects associated with the archived backup snapshot is generated. The restore request for the archived backup snapshot may be authorized after a quorum of approvals is obtained for restore request.

After the quorum of approvals is obtained for the requested restore operation, the cloud-based management system generates an access policy that permits access to the one or more objects included in the request and provides the generated access policy to a cloud storage provider. The cloud storage provider utilizes the generated access policy to determine whether to permit or deny access to objects stored in cloud storage. In some embodiments, the generated policy indicates that access is permitted for objects having a particular prefix. In the event the request is for one or more objects associated with a particular archived backup snapshot, the cloud-based management system may generate a single access policy. In the event the request is for one or more objects associated with one or more archived backup snapshot, the cloud-based management system may generate a corresponding access policy for each of the archived backup snapshots. In some embodiments, the cloud-based management system generates a corresponding access policy on a per bucket basis.

The one or more generated access policies are valid for a limited period of time (e.g., the expected duration of an authorized restore operation, the actual amount of time needed to perform the authorized restore operation, etc.). The cloud-based management system deletes the one or more generated access policies upon a completion of the authorized restore operation or soon thereafter. As a result, the temporary access to the one or more archived objects associated with the archived backup snapshot is terminated and a malicious actor is unable to access the one or more archived objects associated with the archived backup snapshot.

Figure 3:
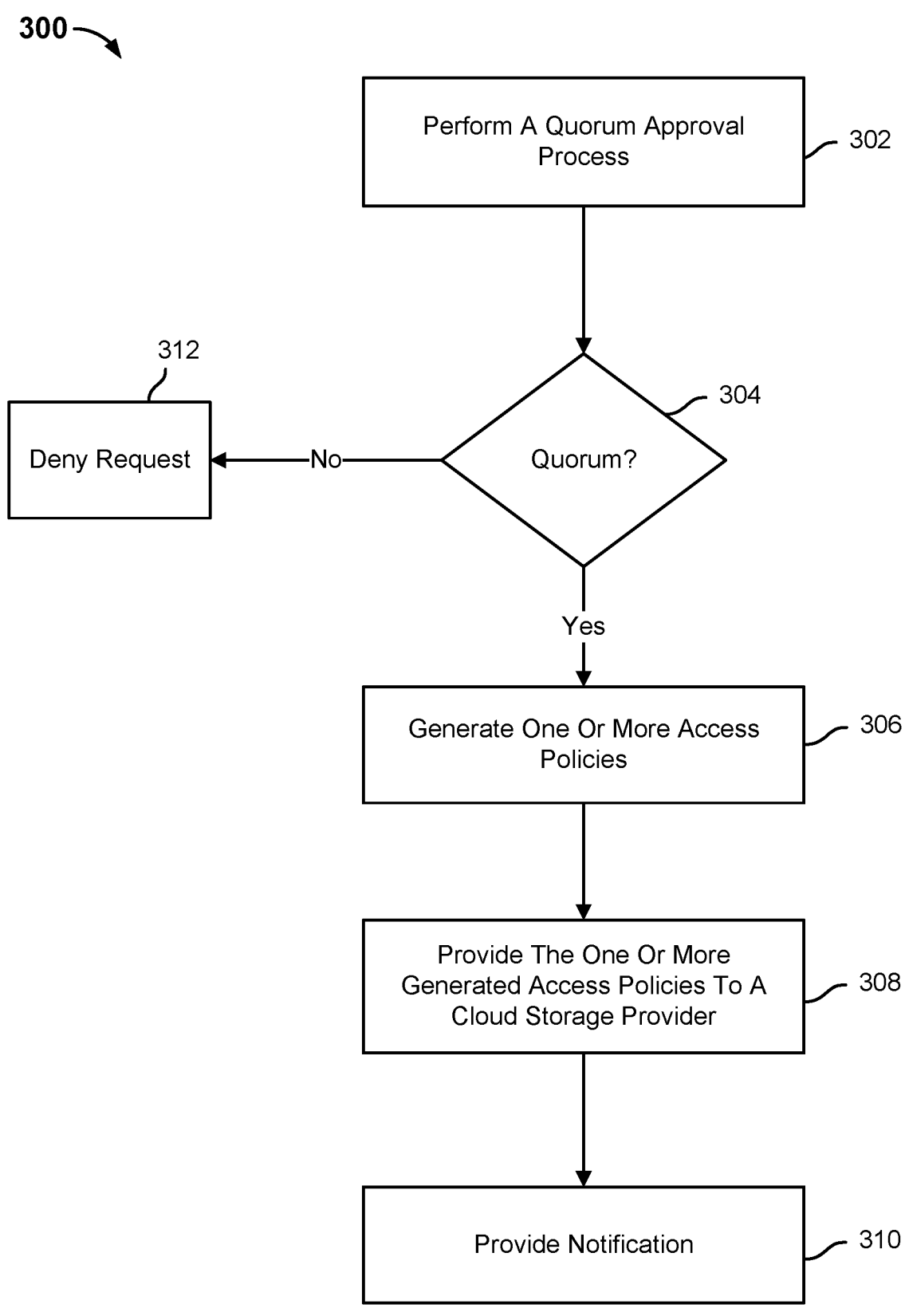
FIG. 3 is a process for automatically managing access policies for archived objects in accordance with some embodiments.

FIG. 3 is a process for automatically managing access policies for archived objects in accordance with some embodiments. In the example shown, process 300 may be implemented by a cloud-based management system, such as cloud-based management system 112. In some embodiments, process 300 is implemented to perform part of step 206 of process 200.

At 302, a quorum approval process is performed. In response to receiving a request for specific data, the cloud-based management system determines whether the requested operation is associated with a quorum policy that requires a quorum of approvals before being allowed to be performed. In response to a determination that the requested operation is not associated with the quorum policy, the cloud-based management system provides to the storage system a command to perform the requested operation. In response to a determination that the requested operation is associated with the quorum policy, the cloud-based management system adds the request to an approval request queue and provides to the approvers included in the set of approvers a notification of the requested operation.

The cloud-based management system initiates a timer that indicates when a quorum of approvals for the requested operation needs to be received. In some embodiments, the timer is specified by an administrator associated with an entity. In some embodiments, the timer is a default amount of time (e.g., 30 minutes).

At 304, it is determined whether the request for specific data stored in the archival storage has received a quorum approval. The cloud-based management system waits for responses from the approvers included in the set of approvers. The cloud-based management system determines whether the required number of approvals for the requested operation has been received within a period of time associated with the timer. A quorum approval has been obtained in response to a determination that the required number of approvals for the request has been received within the period of time associated with the timer.

In the event it is determined that there the request has received a quorum approval, process 300 proceeds to 306. In the event it is determined that the request has not received a quorum approval, process 300 proceeds to 312.

At 306, one or more access policies are generated based on the quorum approval. In the event the request is for one or more objects associated with a particular archived backup snapshot, the cloud-based management system may generate a single access policy. In the event the request is for one or more objects associated with one or more archived backup snapshot, the cloud-based management system may generate a corresponding access policy for each of the archived backup snapshots. In some embodiments, the cloud-based management system generates a corresponding access policy on a per bucket basis.

At 308, the one or more generated access policies are provided to a cloud storage provider. The cloud storage provider utilizes the one or more generated access policies to determine whether to permit or deny access to objects stored in cloud storage.

At 310, a notification is provided to a user device associated with the request. In response to the notification, a user associated with the user device may cause a storage system to initiate a restore of the one or more objects associated with the particular archived backup snapshot.

At 312, the request for the specific data is denied.

Figure 4A:
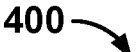
FIG. 4A is a flow diagram illustrating a process for providing credentials for accessing one or more objects stored in an archival storage in accordance with some embodiments.

FIG. 4A is a flow diagram illustrating a process for providing credentials for accessing one or more objects stored in an archival storage in accordance with some embodiments. In the example shown, process 400 may be implemented by a cloud-based management system, such as cloud-based management system 112.

At 402, a request for credentials to access one or more objects stored at an archival storage is received. The request may include a particular prefix associated with the one or more requested archived objects.

At 404, it is determined whether the requested is validated. The cloud-based management system validates the storage system from which the request is received based on one or more factors, such as whether the storage system is registered with the cloud-based management system, whether the storage system is registered to an account associated with the archived backup snapshot, whether a restore operation for the one or more objects associated with the particular archived backup snapshot has been authorized, etc.

In response to a determination that the request is validated, process 400 proceeds to 406. In response to a determination that the request is not validated, process 400 proceeds to 410.

At 406, credentials are created. The credentials (e.g., a token) enable the storage system to access at a cloud storage the one or more requested objects associated with a particular archived snapshot. In some embodiments, the one or more objects are associated with a single archived object and the cloud-based management system generates credentials that allows access to the single archived object. In some embodiments, data of the one or more objects is spread across a plurality of archived objects and the cloud-based management system generates credentials that allows access to the plurality of archived objects that include the data of the one or more objects.

At 408, the credentials are provided to the storage system.

At 410, the request is denied.

Figure 4B:
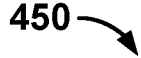
FIG. 4B is a flow diagram illustrating a process for accessing one or more archived objects stored in an archival storage in accordance with some embodiments.
Figure 4B:
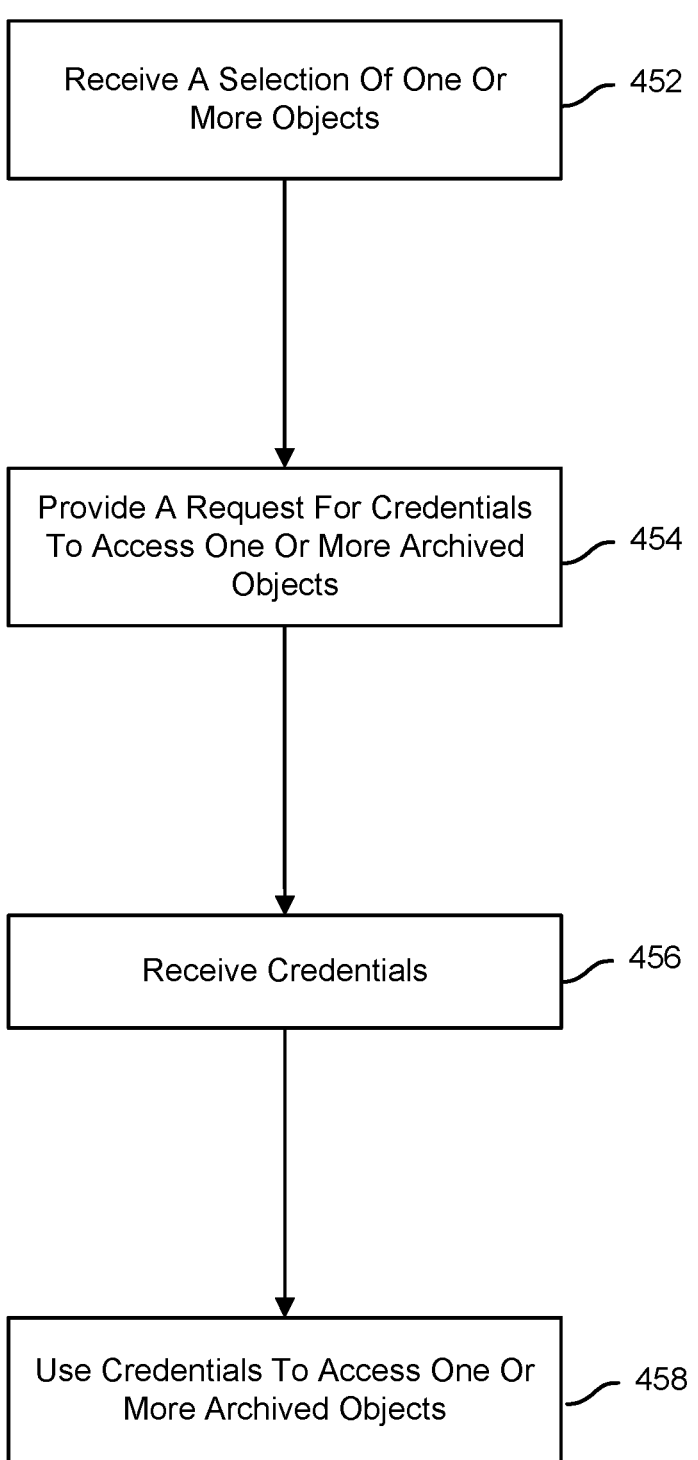

FIG. 4B is a flow diagram illustrating a process for accessing one or more archived objects stored in an archival storage in accordance with some embodiments. In the example shown, process 450 may be implemented by a storage system, such as storage systems 101a . . . 104n.

At 452, a selection of one or more objects for which access is requested is received. The storage system stores an index that identifies the one or more objects associated with one or more archived backup snapshots. In some embodiments, the storage system receives from a user device a selection of one or more objects associated with the particular archived backup snapshot for which a user wants access. In some embodiments, the storage system receives from a user device a selection of one or more objects associated with a plurality of archived backup snapshot for which a user wants access. In some embodiments, the objects are identified based on a prefix.

At 454, a request for credentials to access one or more archived objects is provided to the cloud-based management system. In some embodiments, the request identifies one or more objects having a particular prefix.

At 456, the credentials are received. The storage system receives the credentials after the cloud-based management system validated and approved the request.

At 458, the credentials are used to access one or more archived objects. The storage system provides the credentials to a cloud storage provider associated with a cloud storage. In response to receiving the credentials, the cloud storage provider determines whether to grant access to the one or more archived objects associated with the credentials. The cloud storage provider may grant access to the one or more archived objects associated with the credentials in response to a determination that the cloud storage provider stores an access policy for the one or more archived objects associated with the credentials and the credentials provided by the storage system are active. The credentials provided by the storage system have an associated expiration time.

Figure 5:
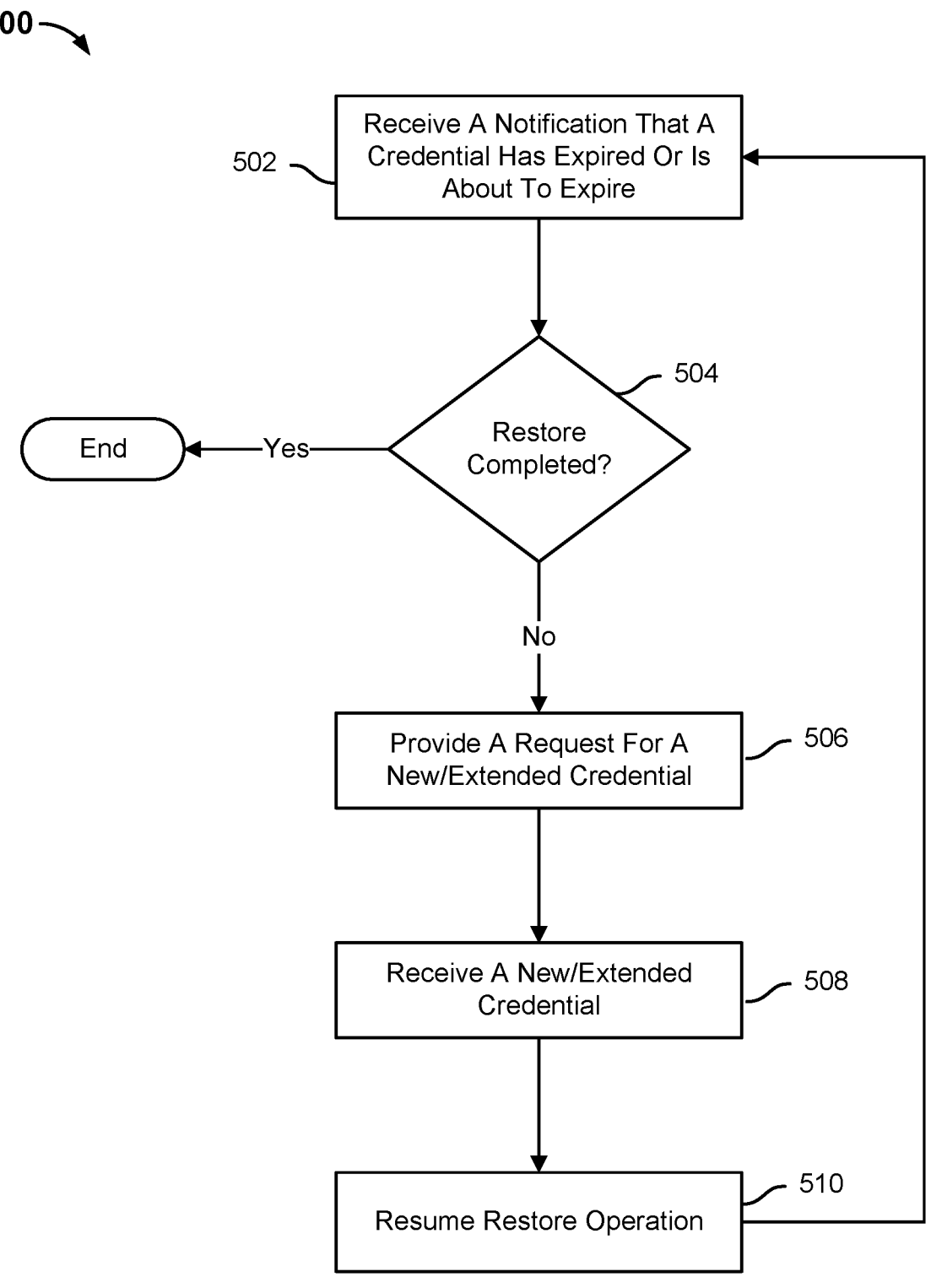
FIG. 5 is a flow diagram illustrating a process for restoring an object in accordance with some embodiments.

FIG. 5 is a flow diagram illustrating a process for restoring an object in accordance with some embodiments. In the example shown, process 500 may be implemented by a storage system, such as storage systems 104a . . . 104n.

A storage system may utilize the credentials generated by a cloud-based management system to access at the cloud storage the one or more objects associated with the particular archived backup snapshot during the authorized restore operation. The credentials have an associated expiration time (e.g., one hour). This prevents a storage system from having unfettered access to the one or more objects associated with the archived backup snapshot. In some embodiments, the credentials expire before a restore of the one or more objects associated with the particular archived backup snapshot has completed.

At 502, a notification that a credential has expired or is about to expire (e.g., 5 minutes from expiration) is received. The notification may be received from a cloud-storage provider associated with a cloud storage storing one or more objects associated with an authorized restore operation.

At 504, it is determined whether a restore operation has completed. In response to a determination that the restore operation has completed, process 500 ends. In response to a determination that the restore operation has not completed, process 500 proceeds to 506.

At 506, a request for new or extended credential is provided to a cloud-based management system. In some embodiments, the request identifies one or more objects having a particular prefix. In response to the request, the cloud-based management system determines whether to approve the request in a manner described process 400.

At 508, a new or extended credential is received.

At 510, a restore operation is resumed. The storage system provides the credentials to the cloud storage provider associated with a cloud storage. In response to receiving the credentials, the cloud storage provider determines whether to grant access to the one or more archived objects associated with the credentials. The cloud storage provider may grant access to the one or more archived objects associated with the credentials in response to a determination that the cloud storage provider stores an access policy for the one or more archived objects associated with the credentials and the credentials provided by the storage system are active. The credentials provided by the storage system have an associated expiration time. The storage system may resume the restore operation upon access being granted by the cloud storage provider.

Figure 6:
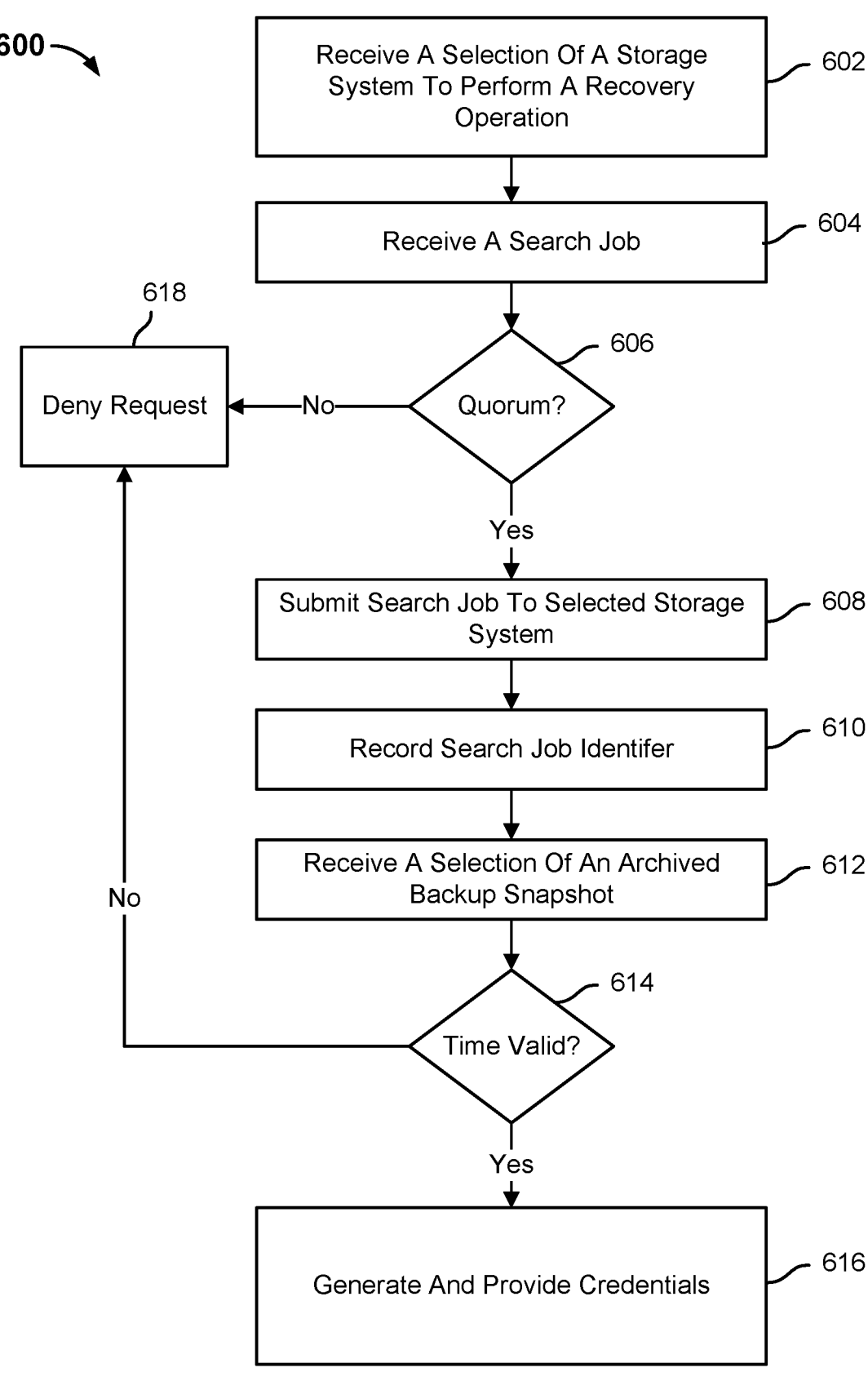
FIG. 6 is a flow diagram illustrating a process for generating credentials to access archived metadata associated with an archived backup snapshot in accordance with some embodiments.

FIG. 6 is a flow diagram illustrating a process for generating credentials to access archived metadata associated with an archived backup snapshot in accordance with some embodiments. In the example shown, process 600 may be implemented by a cloud-based management system, such as cloud-based management system 112.

A storage system, such as storage systems 104a . . . 104n, may archive a backup snapshot to cloud storage. A different storage system than that storage system that archived the backup snapshot may be utilized to restore one or more objects associated with the archived backup snapshot, however, the different storage system may not store metadata associated with the archived backup snapshot that enables the different storage system to restore the one or more objects associated with the archived backup snapshot.

At 602, a selection of a storage system to perform a recovery operation is received. The cloud-based management system may provide to a user device a user interface that indicates a plurality of storage systems associated with an entity. The entity may have a plurality of datacenters located at different locations. Each datacenter may be associated with one or more storage systems. The cloud-based management system may receive a selection of a first storage system of the plurality of storage systems associated with the entity.

At 604, a search job is received. The cloud-based management system may receive from the user device a search job that requests the cloud-based management system to identify one or more archived backup snapshots stored in the cloud storage that were archived by a second storage system. The received search job may include a particular prefix and/or an associated time range.

At 606, it is determined whether a quorum approval has been received for the search job. In response to a determination that the quorum approval has been received for the search job, process 600 proceeds to 608. In response to a determination that the quorum approval has not been received for the search job, process 600 proceeds to 618.

At 608, a search job is submitted to the selected storage system. A cloud storage provider may store backup snapshots and their associated objects in one or more buckets associated with the cloud storage. The cloud storage may be a flat address space. An archived backup snapshot and its associated objects may have a prefix (e.g., string of characters) inserted at the beginning of the snapshot or object's name. Archived backup snapshots and objects having the same prefix are stored in the same bucket. In some embodiments, the backup snapshots and associated objects for a plurality of different storage systems are stored in the same bucket as long as they have the same prefix. The cloud-based management system determines which of the backup snapshots included in a bucket are associated with the second storage system and provides the results to the selected storage system.

At 610, a search job identifier is recorded. The search job identifier indicates that a particular search job has been quorum approved. The search job is associated with a particular timestamp.

At 612, a selection of an archived backup snapshot is received.

At 614, it is determined whether the selection is received within a valid time period. The search job identifier is valid for a particular time period. This prevents unrestricted access to the metadata associated with an archived backup snapshot. In response to a determination that the selection is received within the valid time period, process 600 proceeds to 616. In response to a determination that the selection is received within the valid time period, process 600 proceeds to 618.

At 616, credentials are generated and provided the first storage system. The credentials enable the first storage system to access at cloud storage the metadata associated with the selected archived backup snapshot. In response, the first storage system provides the credentials to the cloud storage provider associated with the cloud storage storing the metadata associated with the selected archived backup snapshot. In response to receiving the credentials, the cloud storage provider determines whether to grant access to the metadata associated with the selected archived backup snapshot. The cloud storage provider may grant access to the metadata associated with the selected archived backup snapshot in response to a determination that the cloud storage provider stores an access policy for the one or more archived objects associated with the credentials and the credentials provided by the first storage system are active. The credentials provided by the storage system have an associated expiration time.

In response to obtaining access to the metadata associated with the selected archived backup snapshot, the first storage system may reconstruct the metadata associated with the selected archived backup snapshot (e.g., tree data structure). The first storage system may utilize the reconstructed metadata associated with the selected archived backup snapshot to restore from the cloud storage to the destination system (e.g., source system 103a . . . 103n) the data content of one or more objects associated with the selected archived backup snapshot. An example of reconstructed metadata associated with the selected archived backup snapshot is described in U.S. patent application Ser. No. 16/186,934 entitled "Cloud Edition and Retrieve," filed on Ser. No. 16/186,934, the entire contents of which are incorporated by reference for all purposes.

At 618, the request is denied. A notification of the denial may be provided to the user device that requested the first storage system to perform the recovery operation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to perform a restore operation to restore data stored in an archival storage, wherein the data is not associated with an access policy that limits access to the data;
   determining that the request to perform the restore operation is an authorized request;
   determining an expected duration for performing the restore operation;
   automatically generating, based on the authorized request, a temporary access policy associated with the data and usable to access the data for performing the restore operation, wherein the temporary access policy is valid for the expected duration for performing the restore operation;
   performing, based on the temporary access policy, the restore operation; and
   terminating, based on the expected duration elapsing, access to the data provided by the temporary access policy.

2. The method of claim 1, wherein the request to perform the restore operation to restore data is for one or more objects associated with one or more archived backup snapshots.

3. The method of claim 1, wherein the request to perform the restore operation to restore the data includes a particular prefix associated with a storage location for the data.

4. The method of claim 1, further comprising: providing the temporary access policy to a cloud storage provider that uses the temporary access policy to determine whether to permit or deny access to the data.

5. The method of claim 1, further comprising: providing, to a user device associated with the request to perform the restore operation to restore the data, a notification that the request has been approved.

6. The method of claim 1, further comprising receiving a request for credentials to access the data stored in the archival storage.

7. The method of claim 6, further comprising validating a storage system from which the request for the credentials to access the data stored in the archival storage is received.

8. The method of claim 7, further comprising denying the request for the credentials to access the data stored in the archival storage in response to a determination that the storage system is not validated.

9. The method of claim 7, further comprising creating credentials to access the data stored in the archival storage in response to a determination that the storage system is validated.

10. The method of claim 9, wherein the credentials are valid for a limited period of time.

11. The method of claim 9, further comprising providing, to the storage system, the credentials to access the data stored in the archival storage to the storage system.

12. The method of claim 11, wherein the storage system utilizes the provided credentials to access the data stored in the archival storage.

13. The method of claim 7, wherein the storage system manages the archival storage.

14. The method of claim 7, wherein the storage system is a different storage system than the storage system that manages the archival storage.

15. The method of claim 1, wherein determining that the request to perform the restore operation is an authorized request comprises performing a quorum approval process.

16. The method of claim 1, wherein determining that the request to perform the restore operation is an authorized request is based on status and timing of one or more authorizations.

17. Computer-readable storage media comprising instructions that, when executed by processing circuitry, cause the processing circuitry to:

> receive a request to perform a restore operation to restore data stored in an archival storage, wherein the data is not associated with an access policy that limits access to the data;
>
> determine that the request to perform the restore operation is an authorized request;
>
> determine an expected duration for performing the restore operation;
>
> automatically generate, based on authorized request, a temporary access policy associated with the data and > usable to access the data for performing the restore operation, wherein the temporary access policy is valid for the expected duration for performing the restore operation;
>
> perform, based on the temporary access policy, the restore operation; and
>
> terminate, based on the expected duration elapsing, access to the data provided by the temporary access policy.

18. A management system, comprising:

one or more processors coupled to memory, the one or more processors and memory configured to:

> receive a request to perform a restore operation to restore data stored in an archival storage, wherein the data is not associated with an access policy that limits access to the data;
>
> determine that the request to perform the restore operation is an authorized request;
>
> determine an expected duration for performing the restore operation;
>
> automatically generate, based on the authorized request, a temporary access policy associated with the data and usable to access the data for performing the restore operation, wherein the temporary access policy is valid for the expected duration for performing the restore operation;
>
> perform, based on the temporary access policy, the restore operation; and
>
> terminate, based on the expected duration elapsing, access to the data provided by the temporary access policy.

* * * * *